(12) United States Patent
Mizoguchi

(10) Patent No.: US 7,242,450 B2
(45) Date of Patent: Jul. 10, 2007

(54) ORIENTATION FILM RUBBING APPARATUS AND METHOD TO SUPPRESS SCRAPING-OFF OF THE ORIENTATION FILM

(75) Inventor: Chikaaki Mizoguchi, Kagoshima (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 107 days.

(21) Appl. No.: 10/931,560

(22) Filed: Sep. 1, 2004

(65) Prior Publication Data

US 2005/0052599 A1    Mar. 10, 2005

(30) Foreign Application Priority Data

Sep. 5, 2003    (JP) .............................. 2003-313969

(51) Int. Cl.
*G02F 1/1337*    (2006.01)
(52) U.S. Cl. ........................ 349/126; 349/123
(58) Field of Classification Search ................ 349/123, 349/126
See application file for complete search history.

(56) References Cited

U.S. PATENT DOCUMENTS

| | | | | |
|---|---|---|---|---|
| 5,075,790 A | * | 12/1991 | Hayashi et al. | ............. 349/126 |
| 5,221,981 A | * | 6/1993 | Kodera et al. | ............. 349/126 |
| 5,455,695 A | * | 10/1995 | Kodera et al. | ............. 349/126 |
| 5,464,478 A | * | 11/1995 | Byun | ............................ 134/1 |
| 5,710,610 A | * | 1/1998 | Kim | ............................ 349/126 |
| 5,963,286 A | * | 10/1999 | Ishibashi et al. | ............. 349/126 |
| 6,862,061 B2 | * | 3/2005 | Horiuchi | ..................... 349/126 |
| 2003/0099845 A1 | * | 5/2003 | Ogawa et al. | ............. 428/447 |
| 2003/0108685 A1 | * | 6/2003 | Tabira et al. | ................ 428/1.2 |

FOREIGN PATENT DOCUMENTS

JP    2003-084287    *    3/2003

* cited by examiner

*Primary Examiner*—Huyen Ngo
(74) *Attorney, Agent, or Firm*—Katten Muchin Rosenman LLP

(57) ABSTRACT

The circumferential dimension of the rubbing cloth 1 is set to one half or below of the circumferential dimension of the rotational roll 2a, the excentric core irregularities produced by the seam of the rubbing roll 2 are made visually unrecognizable, and the circumferential dimension of the rubbing cloth 1 is reduced, thus reducing the rubbing density and preventing the scraping-off of the orientation film.

3 Claims, 3 Drawing Sheets

US 7,242,450 B2

ORIENTATION FILM RUBBING APPARATUS AND METHOD TO SUPPRESS SCRAPING-OFF OF THE ORIENTATION FILM

BACKGROUND OF THE INVENTION

This application claims benefit of Japanese Patent Application No. 2003-313969 filed on Sep. 5, 2003, the contents of which are incorporated by the reference.

The present invention relates to orientation film rubbing apparatus and method for liquid crystal panels and, more particularly, to orientation film rubbing apparatus for and method of rubbing an orientation film of a liquid crystal display element panel of an IPS (In-Plane-Switching) type as lateral electric field drive system.

Usually, for imparting an orientation film of a liquid crystal display element panel with liquid crystal orientation performance, a rubbing process is carried out with a rubbing process, which is formed by winding a clock with thin fur sewed therein on rotational roll, in such a manner as to cause the rubbing roll to roll on the orientation film of the panel and thus cause the surface of the orientation film to be rubbed by the fur of the rubbing roll.

In the rubbing process for the IPS type liquid crystal display element panel, for making the excentric core irregularities to be described later to be visually unrecognizable, the rubbing roll has to be driven for rotation at a high speed.

However, by increasing the rotational speed of the rubbing roll the number of filaments of fur touching the orientation film per unit time (i.e., rubbing density) is increased, thus giving rise to various problems stemming from the scraping-off of the film and re-attachment of resultant particles to the display surface. Specifically, such a problem arises that the display quality is deteriorated by the size fluctuations of the particles attached to the display surface, contrast irregularities due to the density of the attached particles, gap irregularities due to the clamping of the particles between panels and abnormal orientation due to the particles.

SUMMARY OF THE INVENTION

An object of the present invention is therefore to provide liquid crystal display panel rubbing apparatus and method capable of suppressing the scraping-off of the orientation film while maintaining a rotational speed making the excentric core irregularities visually unrecognizable.

According to an aspect of the present invention, there is provided an orientation film rubbing apparatus for rubbing the orientation film of a liquid crystal panel with a rubbing roll, which is obtained by applying a rubbing cloth to the outer periphery of a rotational roll, wherein the rubbing roll is to be held rotated at a high speed, and the rubbing cloth is arranged to suppress the scraping-off of the orientation film by prescribing its circumferential dimension or filament density.

The relative movement speed between the rubbing roll and the orientation film and the rotational speed of the rubbing roll are selected such that the excentric core irregularity pitch is 1.2 mm or below.

According to another aspect of the present invention, there is provided an orientation film rubbing apparatus for rubbing the orientation film of the rubbing roll, which is obtained by applying a rubbing cloth to the outer periphery of a rotational roll, wherein the circumferential dimension of the rubbing cloth of the rotational roll is one half or below of the circumferential dimension of the rotational roll.

The lower limit of the circumferential dimension of the rubbing cloth is 1.2 mm. The rubbing cloth is applied to the entire circumferential dimension of the rotational roll except the seam portion, and the filament density of the rubbing cloth is in a range of 10,000 to 14,000 filaments/cm$^2$. The circumferential dimension of the rubbing cloth is ⅛ to ¼ of the circumferential dimension of the rotational roll. The rotational speed of the rubbing roll is 1200 rotations per minute or above. The liquid crystal panel is a lateral electric field drive system panel structure.

According to other aspect of the present invention, there is provided an orientation film rubbing method of rubbing the orientation film of a liquid crystal panel with a rubbing roll, which is obtained by applying a rubbing cloth to the outer periphery of a rotational roll, wherein one rotation of the rotational roll has a non-contact time interval, in which the rubbing cloth and the orientation film are not in contact with each other, and the circumferential dimension of the rubbing cloth applied to the rotational roll is adjusted such that the non-contact time interval is longer than a contact time interval, in which the rubbing cloth and the orientation film are out of contact in one rotation of the rotational roll.

The relative moving speed between the rubbing roll and the orientation film, the rotational speed of the rubbing roll and the non-contact time interval are selected such that the excentric core irregularity pitch is 1.2 mm or below.

Other objects and features will be clarified from the following description with reference to attached drawings.

PREFERRED EMBODIMENTS OF THE INVENTION

Preferred embodiments of the present invention will now be described with reference to the drawings.

In the orientation film rubbing apparatus according to the present invention, for reducing the rubbing density while holding the high speed rotation, the circumferential dimension of the rubbing cloth or the filament density is reduced. By reducing the circumferential dimension of the rubbing clock, the excentric core irregularities due to the high speed rotation is made visually unrecognizable, while reducing the number of fur filaments of the rubbing cloth touching the orientation film per rotation of the rubbing roll. That is, it is possible to obtain the advantages that the rubbing density is reduced, that the scraping of the orientation film heretofore occurring the excessive rubbing density is reduced, that the problems stemming from the scraping particles of the orientation film are precluded, and that the liquid crystal display panel of satisfactory display grade is obtainable.

Particularly, by setting the circumferential dimension of the rubbing cloth applied to the rubbing roll to be less than one half of the circumferential dimension of the rubbing roll, the rubbing cloth can be replaced in a state that the rubbing roll is mounted on the apparatus. It is thus possible to reduce the maintenance time and improve yield factor of the apparatus.

The rubbing density can be reduced by reducing the density of rubbing cloth fur filaments (per one square centimeter). Accordingly, in a different rubbing apparatus according to the present invention, the filament density of the rubbing cloth which is wound on the entire periphery of a rotational roll 10a rotatable at a high speed is reduced to one half compared to the prior art case, thus suppressing the surplus rubbing density and obtain the same advantages as obtainable with the prior art orientation film rubbing apparatus.

Figure 2:
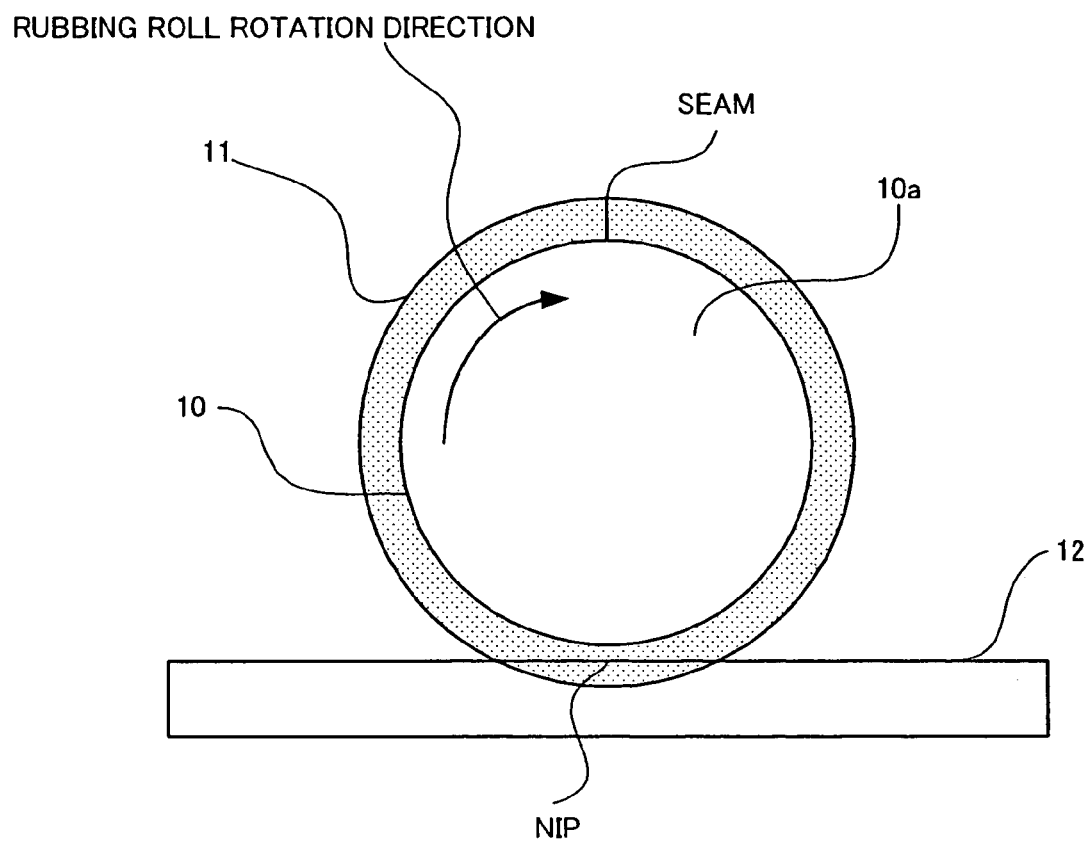
FIGS. 2 and 3 are views for describing the process up to the completion of the present invention.
Figure 3:
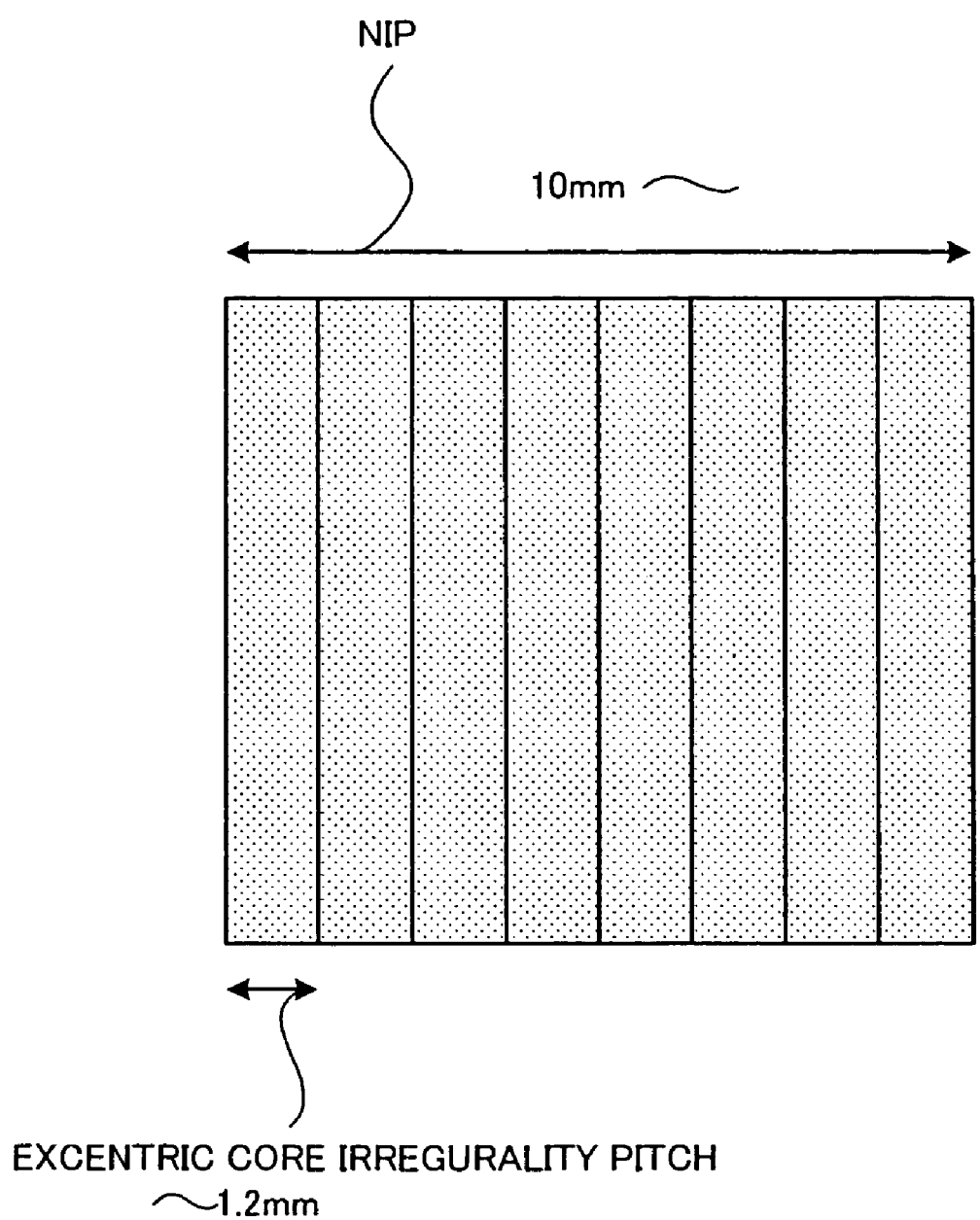

FIGS. 2 and 3 are views for describing the process up to the completion of the present invention.

In the prior art rubbing method, as shown in FIG. 2, the orientation process is carried out by winding a rubbing cloth 11 with a filament density of 2,800 filaments/cm$^2$ on the outer periphery of the rotational roll 10a to obtain a rubbing roll 10, which is then rotated and pushed against a liquid crystal display panel 12 moved in one direction. At this time, as shown in FIG. 3, excentric core irregularities are produced due to the presence of the seams of the rubbing cloth, lack of circumferential balance uniformity, etc. These excentric core irregularities appear as a stripes pattern perpendicular to the rubbing direction and having a pitch synchronized to the cycle of rotation of the rubbing roll 10 due to such cause as the seams of the rubbing cloth.

In an example, a rubbing process was carried out by setting the contact width, which is produced by the pushing of the rubbing roll into the orientation film (hereinafter referred to as nip), to about 10 mm, setting the speed of movement of the liquid crystal display panel 12 to 25 mm per second and increasing the rotational speed of the rubbing roll 10 from the conventional 500 rpm to a high speed of 1250 rpm. Consequently, the eccentric core irregularities were reduced to 1.2 mm or below. It was thus found that by reducing the excentric core irregularity pitch in this way, the excentric core irregularities can be made visually unrecognizable.

However, although it is possible to obtain an advantage that the excentric core irregularities can be made visually unrecognizable, the value of the rubbing density (i.e., circumferential dimension (in mm))×rotational speed (in rpm)/movement speed of panel (in mm/sec.) becomes excessive due to high speed rotation, thus giving rise to the generation of great quantity of scraping-off of the orientation film and production of scraping-off particles of the orientation film as described before.

Therefore, in the orientation film rubbing apparatus according to the present invention, the rubbing density is reduced while holding a high rotational speed by reducing the circumferential dimension (length) of the rubbing cloth or the filament density. Particularly, in a preferred embodiment of the present invention, which is an orientation film rubbing apparatus comprising a rubbing roll, which is applied to the outer periphery of a rotational roll 10a and rotatable by rubbing the orientation film of the liquid crystal display element panel with the above rubbing cloth, the rubbing density is reduced by reducing the circumferential circumferential dimension of the rubbing cloth to one half or below of the circumferential dimension of the rotational roll 10a.

In a different embodiment of the present invention, the filament density (i.e. ,the number of fur filaments of the rubbing cloth per one square centimeter) of the rubbing cloth wound on the rotational roll is set to one half in the prior art, and with this filament density the rubbing roll is rotated at a high speed for rubbing the orientation film.

In this way, the eccentric core irregularities in the orientation film are made visually unrecognizable, and also the scraping-off of the orientation film is avoided.

Figure 1:
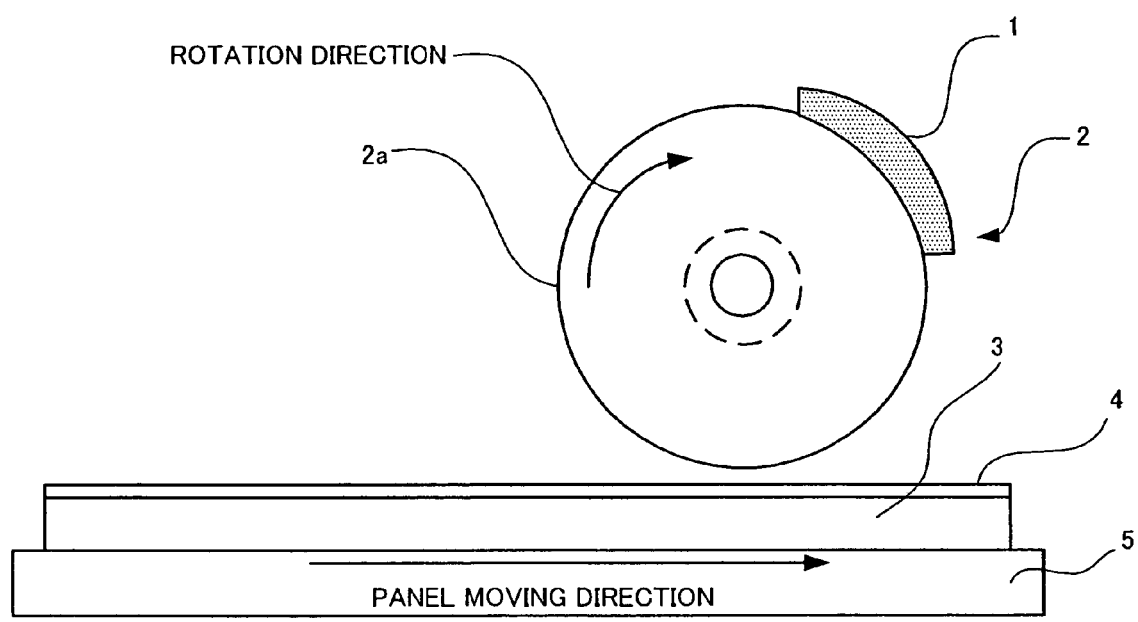
FIG. 1 is a view showing the arrangement of a rubbing apparatus for describing a subject matter of the present invention.

FIG. 1 is a view showing the arrangement of a rubbing apparatus for describing a subject matter of the present invention. This rubbing apparatus, as shown in FIG. 1, comprises a rubbing roll 2 rotatable in the direction of arrow and a rubbing cloth 1 having a circumferential direction corresponding to one half or below of the circumferential dimension of the rotational roll 2a and applied to the rotational roll 2a.

While the rubbing roll 2 is rotated, a stage 4 is moved in the direction of arrow, thus carrying out an orientation film rubbing process of rubbing the orientation film 5 of the liquid crystal display panel 3 with the fur of the rubbing cloth. In this process, a non-contact time, in which the rubbing cloth 1 of the rubbing roll 2 and the orientation film are not in contact with each other, and a contact time in which the rubbing cloth 1 and the orientation film are in contact, are involved in one rotation of the rubbing roll 2. The contact time is adjustable with the circumferential dimension of the rubbing cloth.

Of course, for making the excentric core irregularities visually unrecognizable, the relative speed between the rubbing cloth 1 and the orientation film, the rotational speed of the rubbing roll and the non-contact timer can be set as desired such that the eccentric core irregularity pitch is 1.2 mm or below.

The rubbing cloth 1 may be cotton cloth, nylon cloth and Rayon cloth, and is desirably Rayon cloth. The rubbing density of the rubbing cloth 1 is adjustable with the circumferential dimension (length) of the rubbing cloth. For ready handling of the rubbing cloth 1, the size of the rubbing cloth 1 is set to one-fourth of the circumferential dimension of the rotational roll 2a, thus reducing the rubbing density and preventing the scraping-off of the orientation film 5.

As described before, although the scraping-off of the orientation film 5 can be suppressed by reducing the circumferential dimension of the rubbing cloth 1, doing so is liable to result in reduction of the orientation prescribing force due to reduction of the rubbing density. This means that limitation is imposed on the circumferential dimension reduction of the rubbing cloth 1. An experiment was conducted by setting the circumferential dimension of the rubbing cloth to one-eighth of the circumferential dimension of the rubbing roll 2. As for the conditions of the orientation film rubbing process, like the case of the one-fourth circumferential dimension rubbing cloth, the rotational speed of the rubbing roll was set to 1,250 rpm, and the panel feed speed was set to 25 mm/sec. As a result, no substantial difference from the usual panel was observed insofar as the display is concerned, and substantially no scraping-off particle was produced in the rubbing. The orientation index DΔ as an index of the orientation prescribing force of the orientation film was measured with an elipthometer to obtain a value of 2 (deg.) or more. Also, the orientation prescribing force was in a sufficiently practical range. Another experiment was conducted under the same conditions except for the rubbing cloth circumferential dimension is reduced, and reduction of the orientation prescribing force was observed.

In this embodiment, for eliminating the scraping-off of the orientation film, the rubbing density can be reduced by reducing the filament density as well. As an example, the orientation film rubbing process was carried out by reducing the rubbing density from the conventional value of 28,000 filamewnts/cm$^2$ to a range of 10,000 to 14,000 filaments/cm$^2$, setting the rotational speed of the rubbing roll to 1,250 rpm, setting the panel feed speed of 25 mm/sec. and setting a nip of about 10 mm. In this example, like the above case of setting one half the rubbing cloth circumferential dimension, satisfactory results can be obtained.

As has been described in the foregoing, for reducing excess rubbing density, in the first embodiment the circumferential dimension of the rubbing cloth is reduced, while in the second embodiment the filament density is reduced.

The present invention is also applicable to the orientation film rubbing process for a liquid crystal display panel of a TN type or the like other than the IPS system liquid crystal display panel as well.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An orientation film rubbing apparatus for rubbing the orientation film of a liquid crystal panel with a rubbing roll, which is obtained by applying a rubbing cloth to the outer periphery of a rotational roll, wherein the circumferential dimension of the rubbing cloth of the rotational roll is one half or below of the circumferential dimension of the rotational roll.

2. The orientation film robbing apparatus according to claim 1 wherein the lower limit of the circumferential dimension of the rubbing cloth is 1.2 mm.

3. The orientation film rubbing apparatus according to claim 1 wherein the circumferential dimension of the rubbing cloth is $\frac{1}{8}$ to $\frac{1}{4}$ of the circumferential dimension of the rotational roll.

* * * * *